United States Patent Office.

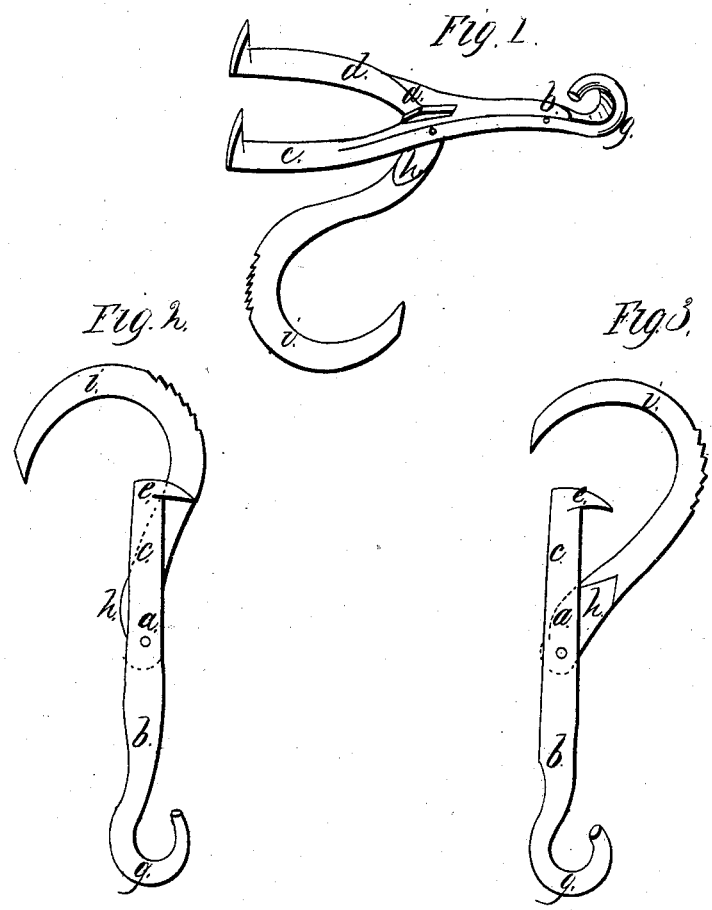

JOHN W. PATTEE, OF THORNTON, NEW HAMPSHIRE, ASSIGNOR TO HIMSELF AND EPHRAIM ELLIOTT, OF LOWELL, MASSACHUSETTS.

Letters Patent No. 79,853, dated July 14, 1868.

IMPROVED PAINTER'S HOOK.

*The Schedule referred to in these Letters Patent and making part of the same.*

TO ALL WHOM IT MAY CONCERN:

Be it known that I, JOHN W. PATTEE, of Thornton, in the county of Grafton, and State of New Hampshire, have invented new and useful Improvements in Painter's Hooks; and I do hereby declare that the following is a full and exact description thereof, reference being had to the accompanying drawings, and to the letters of reference marked thereon.

The nature of my invention consists in providing for painter's use a suitable device or hook, whereby they can secure the pot of paint to the ladder, clapboards, or on any projection from the house, giving him, at the same time, free access to the paint, and the pot in no danger from being upset, thus spilling the entire contents of the same.

To enable others skilled in the art to make and use my invention, I will proceed to describe its construction and operation.

Figure 1 represents a perspective view of a finished hook, showing the position of the same when applied to the clapboards of a house.

Figure 2 represents a side elevation of the hook, showing its position when applied to the round of a ladder.

Figure 3 represents a similar elevation, showing its position when applied to a projection from the house.

Similar letters in the different figures indicate corresponding parts.

I construct my improved device of two parts, $a$ and $b$. The part, $a$, of the device at one end is two forked arms, $c$ and $d$, their extreme ends being provided with sharp projections or catches, $e$ and $f$, which project at right angles with the arms $c$ and $d$, its opposite end being provided with an eye-hook, $g$. At the junction of the forked arms $c$ and $d$ a slot or mortise is made for the reception of the shank $h$ of the main hook $i$, it being pivoted and secured by a suitable pin. The convex side of this hook $i$ is serrated, barbed, or supplied with a suitable projection.

My improved hook, as constructed, is adapted and can be used in at least three different positions to a great advantage.

First, as represented in fig. 1 of the drawings, the hook can be secured to the wall of the house at any point desired easily, by placing and pressing the projections $e$ and $f$ into the under edge of the clapboard, and is held in the required position by the curved barbed edges of the main hook $i$, which comes in contact with the surface of the clapboard, the barbs projecting into the same. This point forms a fulcrum for the eye-hook $g$, in which the bail of the painter's pot is hung or attached. Thus, when in this position, the device forms a perfect bracket, giving perfect security and safety to the painter's pot or pail.

The second position, as seen in fig. 2: the main hook $i$ is easily and readily hung to the round of a ladder, and the eye-hook $g$ is ready to receive the bail of the pot or pail, as before described, with the same advantages.

The third position, as seen in fig. 3: the main hook $i$, its point being sharp, can be adjusted and hung to any projecting portion of the building with equal safety to suspend the pot or pail, and with like advantages to the painter.

What I claim as my invention, and desire to secure by Letters Patent, is—

The combination and arrangement of the arms $c$ and $d$ with their projections $e$ and $f$, eye-hook $g$ or its equivalent, and main hook $i$, with or without the projection or barbs, when arranged substantially as described, and for the purposes fully set forth.

JOHN W. PATTEE.

Witnesses:
WILLIAM W. GLADIN,
GEO. E. PEVEY.